United States Patent
Watson et al.

(10) Patent No.: US 8,185,109 B2
(45) Date of Patent: May 22, 2012

(54) IDENTIFYING COMMUNICATIONS BETWEEN TELECOMMUNICATIONS NETWORKS

(75) Inventors: John Mahony Watson, Newbury (GB); John Leadley Moughton, Oxford (GB); Ann Marie Gargulak, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 866 days.

(21) Appl. No.: 12/090,839

(22) PCT Filed: Oct. 19, 2006

(86) PCT No.: PCT/GB2006/003893
§ 371 (c)(1),
(2), (4) Date: Aug. 8, 2008

(87) PCT Pub. No.: WO2007/045881
PCT Pub. Date: Apr. 26, 2007

(65) Prior Publication Data
US 2008/0311907 A1    Dec. 18, 2008

(30) Foreign Application Priority Data
Oct. 19, 2005 (GB) .................... 0521269.1

(51) Int. Cl.
*H04W 4/00* (2009.01)
(52) U.S. Cl. .................... 455/435.1; 455/41.2; 455/411; 455/419; 455/433; 455/435.2; 370/328; 370/338
(58) Field of Classification Search .......... 455/410–411, 455/432.1–435.3; 370/328, 331, 352, 401
See application file for complete search history.

(56) References Cited

U.S. PATENT DOCUMENTS

| | | | | |
|---|---|---|---|---|
| 6,397,065 | B1 * | 5/2002 | Huusko et al. | 455/435.2 |
| 6,584,314 | B1 * | 6/2003 | Haumont et al. | 455/435.1 |
| 6,954,641 | B2 * | 10/2005 | McKenna et al. | 455/435.1 |
| 7,107,057 | B2 * | 9/2006 | Arazi et al. | 455/443 |
| 7,693,516 | B2 * | 4/2010 | Hundal et al. | 455/435.1 |
| 7,933,598 | B1 * | 4/2011 | Agrawal et al. | 455/436 |
| 8,060,084 | B2 * | 11/2011 | Buckley et al. | 455/432.1 |
| 2004/0162058 | A1 * | 8/2004 | Mottes | 455/411 |
| 2005/0266826 | A1 * | 12/2005 | Vlad | 455/410 |
| 2006/0068799 | A1 * | 3/2006 | Morton et al. | 455/450 |
| 2009/0215449 | A1 * | 8/2009 | Avner | 455/433 |

FOREIGN PATENT DOCUMENTS

| | | |
|---|---|---|
| EP | 1 263 247 | 12/2002 |
| WO | 2002/074002 | 9/2002 |
| WO | 2003/037021 | 5/2003 |
| WO | 2004/1030393 | 4/2004 |

* cited by examiner

*Primary Examiner* — Sharad Rampuria
(74) *Attorney, Agent, or Firm* — Workman Nydegger

(57) ABSTRACT

A telecommunications system is disclosed including a host telecommunications network (A) having a radio access network (6) and a virtual telecommunications network (C) with which a telecommunications device (3) is registered and operable to communicate with a telecommunications device (3) using the radio access network (6) of the host telecommunications network (A). Network (C) is therefore an MVNO. The network (C) includes means for generating an identifier for indicating that the telecommunications device is registered with the network (C) and for adding that identifier to communications related to the telecommunications device (3) transmitted to elements of the host telecommunications network (A). This identifier is a virtual network identifier (VNID), and can be used by the elements of the network (A) to provide differentiated services to subscribers of the network (C).

24 Claims, 4 Drawing Sheets

IDENTIFYING COMMUNICATIONS BETWEEN TELECOMMUNICATIONS NETWORKS

FIELD OF THE INVENTION

The present invention relates to a telecommunications system including a first telecommunications network having a radio access network and a second telecommunications network with which a telecommunications device is registered and operable to communicate with the telecommunications device using the radio access network of the first telecommunications network. More particularly, but not exclusively, the second telecommunications network is a "virtual" network, operated by a Mobile Network Virtual Operator (MVNO). The present invention also relates to a method of identifying a telecommunications device registered with a second telecommunications network, wherein the second telecommunications network communicates with the device using the radio access network of a first telecommunications network.

BACKGROUND TO THE INVENTION

An MVNO is a service provider that does not have its own radio access network, but re-sells wireless services, typically under its own brand name, using the radio access network (and other network elements) of a host Public Land Mobile Network (PLMN) operator. A PLMN operator may host one or more MVNOs that may or may not have their own HLR/HSS and/or other network equipment. When hosting an MVNO, it should be possible for the hosting PLMN to differentiate its service offerings to the MVNOs subscribers.

Conventionally, the PLMN operator allocates MVNO subscribers a particular range of International Mobile Subscriber Identity (IMSI) values. This allows the PLMN operator to analyse a received IMSI and to determine whether that IMSI relates to a subscriber of the host PLMN or the MVNO. However, such a mechanism of distinguishing between subscribers is cumbersome to manage, for example when replacing lost or stolen mobiles. Also, this solution is not readily scaleable. Once the range of IMSI values allocated to the MVNO has been exhausted, a second range of values must be allocated.

Calls between subscribers of the same MVNO are considered to be "on-net", whilst calls between an MVNO subscriber and a subscriber of the host PLMN are considered to be "off-net". Different charges may be applied to on-net and off-net calls.

In addition to different routing of the communications, MVNO subscribers may also be provided with different services, such as a dedicated directory enquiry service of the MVNO operator, a different voice mail system and a different administration of their contact numbers.

Host PLMN operators may choose to host MVNOs or, for regulatory reasons, may be obliged to open up their networks to MVNOs. In either case there is a need to keep operations and maintenance overhead costs to a minimum, route calls efficiently and, for regulatory purposes, to be able to demonstrate that the hosted MVNOs are not being treated unfairly and not being disadvantaged.

It would be desirable to be able to more easily identify subscribers belonging to particular MVNOs, without necessarily having to allocate and analyse IMSIs.

SUMMARY OF THE INVENTION

According to a first aspect of the present invention, there is provided a telecommunications system including a first telecommunications network having a radio access network and a second telecommunications network with which a telecommunications device is registered and operable to communicate with the telecommunications device using the radio access network of the first telecommunications network; characterised by means for generating an identifier for indicating that the telecommunications device is registered with the second telecommunications network and for adding this identifier to communications related to the telecommunications device transmitted to elements of the first telecommunications network.

The second network in the embodiment is a virtual network, for example an MVNO. The identifier in the embodiment is a Virtual Network Identifier (VNID).

In the embodiment to be described, it is proposed that the VNID be added to the subscriber information held in the HLR/HSS. It is envisaged that, in addition to the MSC, the VNID will be downloaded to the SGSN and sent to the GGSN via GTP-C. The VNID will be used with RADIUS, DIAMETER and for charging purposes; it should also be used with CAMEL. There are many services that need to be differentiated and so the MVNO Identifier may be sent to several other entities, including but not limited to, the MMSC, SMSC, Lawful Intercept equipment, etc. The VNID might be used by the Radio Access Network (RAN) to control user priority access to the RAN for e.g. congestion control, and/or to manage neighbour lists and measurements in the mobile terminal.

The generating means in the embodiment comprises a home location register, which retrieves the identifier from a store. In the embodiment the home location register receives the IMSI of the mobile telecommunications device and retrieves the identifier in dependence thereon. For example, the home location register has access to a look-up table which stores the identifier for each relevant IMSI.

The identifier generating means may be provided in the first telecommunications network, or in the second telecommunications network. In the embodiment the identifier generating means may be in the first (host) network or the second (virtual) network.

The identifier may be provided to the radio access network of the first (host) network. This may be advantageous because it allows the radio access network to record use of the radio access network by the device registered with the second (virtual) network, which use does not generate billing records in the core of the first (host) network. Also, this can be advantageous to block access of the mobile terminal registered with the second (virtual) network to particular services of the first (host) network—for example, 3G services. Further, this may allow the radio access network to give priority to subscribers of either the first or second network at times of congestion.

Some elements of the first (host) telecommunications network are adapted to interpret the identifier. Other elements of the first network may not be so adapted. Such elements will simply ignore the identifier who will otherwise process data packets including the identifier in a conventional manner. The presence of the identifier will not prevent such elements processing the data packet.

According to a second aspect of the present invention, there is provided a method of identifying a telecommunications device registered with a second telecommunications network, wherein the second telecommunications network communicates with the device using a radio access network of a first telecommunications network, characterised by generating an identifier that indicates that the telecommunications device is registered with the second telecommunications network and adding this identifier to communications related to the first telecommunications device transmitted to elements of the first telecommunications network.

BRIEF DESCRIPTION OF THE DRAWINGS

For a better understanding of the present invention, an embodiment will now be described by way of example and with reference to the accompanying drawings in which.

In the drawings like elements are generally designated with the same sign.

DETAILED DESCRIPTION OF EMBODIMENT OF THE INVENTION

Figure 1:
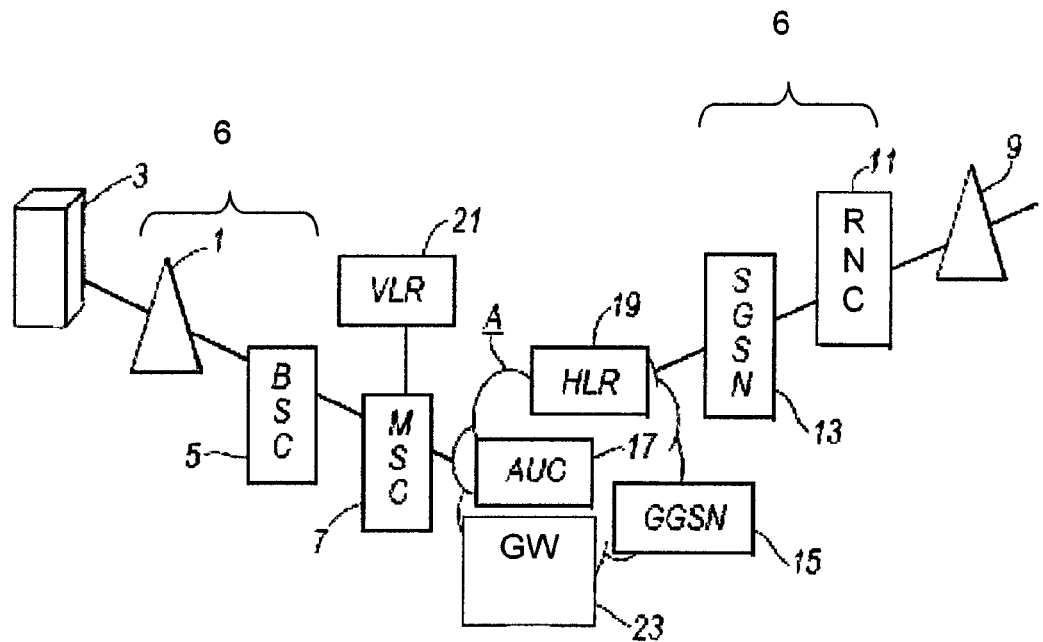
FIG. 1 is a diagrammatic drawing of a mobile telecommunications network.

FIG. 1 diagrammatically explains the apparatus of a GSM/GPRS/UMTS mobile or cellular telecommunications network A.

Network A has a number of base transceiver stations (BTSs) 1 (one of which is shown). Each base transceiver station corresponds to a respective cell of the mobile telecommunications network and wirelessly receives communications from and transmits communications to a mobile device ("mobile station", MS) 3 in that cell by radio. The base transceiver station 1 is controlled by a base station controller (BSC) 5. The BSC 5 may control more than one base transceiver station 1. Together, the base transceiver station 1 and the BSC 5 are referred to as a base station (BS), and comprise the Radio Access Network (RAN) 6 of the network A. Base stations are arranged in groups and each group of base stations is controlled by a mobile switching centre (MSC), such as MSC 7.

The base transceiver station 1, BSC 5 and MSC 7 are used to route calls in the circuit switched domain. In order to route calls in the packet switched domain, the network A may comprise a plurality of Node Bs 9 (only one of which is shown), each of which is associated with a radio network controller (RNC) 11, and comprise the RAN 6 of the network A. The node B 9 and the RNC 11 are controlled by serving GPRS support node (SGSN) 13. In the packet switched domain, the node B 9, RNC 11 and SGSN 13, broadly perform a function corresponding respectively to the base transceiver station 1, BSC 5 and MSC 7 in the circuit switched domain. It should be understood that, although only one of each of the above components is illustrated in FIG. 1, in practice, the mobile telecommunications network will comprise a multiplicity of these elements.

The network A also includes a gateway GPRS support node (GGSN 15) which enables IP-based communications with other networks.

The MS 3 (and each other mobile device that has a subscription with the network A) is provided with a subscriber identity module. In 3GPP the identity of a subscriber is encoded in a identity module application which is contained on a Universal Integrated Circuit Card (UICC) or on a GSM SIM card. The UICC or GSM SIM card is a removable component of the MS. Three types of identity modules are used in the 3GPP system:

Universal Subscriber Identity Module (USIM)
IMS Subscriber Identity Module (ISIM)
Subscriber Identity Module (SIM) according to GSM
Herein, these identity modules are all referred to as a SIM.
General requirements for subscriber identification are
In a 3GPP system each subscriber shall be uniquely identifiable.
The serving networks shall be able to authenticate any subscriber that roams onto their network
If a MS that is registered on the serving network, contains a GSM SIM card or a UICC containing an identity module application, the serving network shall be able to identify the associated home PLMN.

During the manufacturing process of each SIM, authentication information is stored thereon under control of the mobile telecommunications network A. The mobile telecommunications network A itself stores details of each of the SIMs issued under its control. In operation of the network A, the MS 3 is authenticated (for example, when the user activates the terminal in the network with a view to making or receiving calls) via the network A by sending a challenge to the terminal 3 incorporating a SIM, in response to which the SIM calculates a reply (dependent on the predetermined information held on the SIM—typically an authentication algorithm and a unique key Ki) and transmits it back to the network A. The mobile telecommunications network A includes an authentication processor (AUC) 17 which generates the challenge and receives the reply from the MS 3. Using information pre-stored concerning the content of the relevant SIM, the AUC 17 calculates the expected value of the reply from the SIM/MS 3. If the reply received matches the expected calculated reply, the SIM and the associated MS3 are considered to be authenticated.

In addition to authentication information, the SIM is pre-programmed with a unique identification number, the International Mobile Subscriber Identity (IMSI) which is not visible on the SIM and is not known to the subscriber. The subscriber is of course also issued with a publicly known telephone number, that is the subscriber's telephone number, by means of which calls to that subscriber are initiated by callers. This number is the MSISDN (Mobile Station International ISDN Number).

The network A includes a home location register (HLR) 19 which, for each subscriber to the network A, stores the IMSI and the corresponding MSISDN together with other subscriber data. When a subscriber activates MS 3 in the network A in the circuit switched domain, the MS 3 transmits the IMSI from the SIM to the base transceiver station 1, and from there to the BSC 5 and thence to the MSC 7. The MSC 7 then accesses an appropriate location in the HLR 19 and extracts the corresponding subscriber MSISDN and other subscriber data from the appropriate storage location, and stores it temporarily in a visitor location register (VLR) 21 associated with the MSC 7. In this way, therefore, the particular subscriber is effectively registered with the particular MSC (MSC 7), the subscriber's information being temporarily stored in the VLR (VLR 21) associated with that MSC.

Each of the MSCs of the network A has a respective VLR associated with it and operates in the same way as already described when a subscriber activates their MS in one of the cells corresponding to one of the base stations controlled by that MSC.

When the subscriber wishes to make a call using MS 3, having already registered with the network A using the SIM coupled to the MS 3 in the manner described above, the subscriber enters the telephone number of the called party in the usual way. This information is received by the base transceiver station 1 and subsequently by the base station controller 5, and the call is then routed to the called party via the MSC 7. By means of the information held in the VLR 21, MSC 7 can associate the call with a particular subscriber and thus record information for charging purposes.

Similarly, when a calling party (whether a subscriber within the network or outside it) makes a call for the subscriber holding MS 3, the MSC 7 is able to route this call to the MS 3 via the BSC 5 and base transceiver station 1, using the information relating to that subscriber and to MS 3 which is temporarily stored in VLR 21.

The foregoing is merely a simplified description of the operation of a subscriber's MS 3 when in the subscriber's home network. The home network is the network with which the subscriber is generally permanently registered, although the home network may be changed periodically, for example as disclosed in WO-A-03 013173 ("Extended Roaming"). However, typically the subscriber's SIM will be permanently or semi-permanently registered with the home network. The subscriber will have a contract with the home network (possibly via an intermediary) for the supply of telecommunication services. The home network includes details of the subscriber's subscription status and includes facilities for determining whether the status is such that mobile telecommunications services should be offered to the subscriber. For example, if payment of the subscriber's account is overdue, telecommunications services may be suspended.

Figure 2:
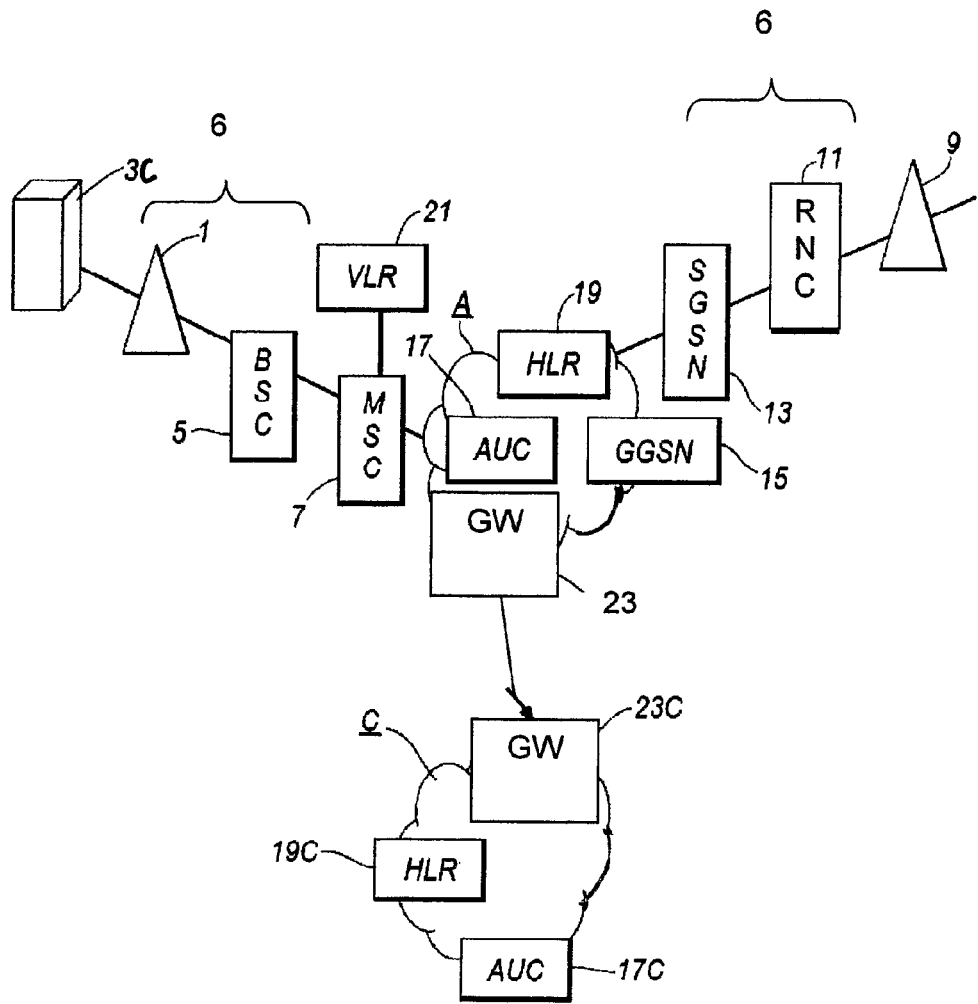
FIG. 2 is a diagrammatic drawing of the home mobile telecommunications network of FIG. 1 and a virtual mobile telecommunications network.

As mentioned above, a new class of telecommunications network has recently come into existence, referred to as a "virtual network". Such virtual networks are said to be operated by so-called Mobile Virtual Network Operators (MVNOs). Virtual networks do not have their own radio access networks but may include some or all of the other components of a "conventional" mobile telecommunications network (such as network A). Such a virtual mobile telecommunications network C is shown in FIG. 2. The virtual network C has an agreement with network A to use the radio access network of network A in order to wirelessly route calls to the subscribers of network C. Details of the subscribers of network C are stored in the HLR 19C of network C in the manner similar to a normal network A as described above. Also, the virtual network C will provide its subscribers with a SIM that allows the subscriber's mobile device to be registered with the network C. The SIM will include an IMSI in the manner described above. That IMSI may be allocated by the network A. A commercial contract between network C and network A allows the subscribers of network C to use the radio access network of network A on payment for such access by network C.

The virtual network C may include, inter alia, an authentication server (AUC) 17C, HLR 19C and gateway.

The gateway 23C of network C allows the network C to connect to the PSTN and also to the network A via the gateway 23 of network A. Subscribers to the network C will have an MSISDN for allowing calls to be routed to the gateway 23C. The gateways 23 and 23C may operate in a similar way to an MSC or SGSN.

MS 3C has a SIM associated with it which is issued under the control of virtual network C, and the user of MS 3C is therefore a subscriber of network 3C. As explained above, virtual network C has no radio access network of its own. A commercial contract between virtual network C and network A allows subscribers of virtual network C to use the radio access network of network A. When the subscriber activates MS 3C within the radio access network of network A, the MS 3C transmits the IMSI from its SIM to the local base transceiver station 1, and from there to the relevant BSC 5 and thence to the appropriate MSC 7 (or the local Node B 9, and from there to the relevant RNC 11 and thence to the appropriate SGSN 13). The MSC 7 (or SGSN 13) recognises, from the value or structure of the IMSI that the subscriber is not a subscriber to network A but is a subscriber to virtual network C. The MSC 7 (or SGSN 13) will access HLR 19C of the virtual network C, via gateways 23 and 23C, and the link between them 27. The subscriber's information, including the relevant MSISDN and other subscriber data, will be accessed from HLR 19C and temporarily stored in the VLR 21 associated with the MSC 7 or SGSN 13. According to an important feature of the embodiment, the HLR 19C stores a Virtual Network Identifier (VNID) for each subscriber of the network C. For example, the HLR 19C includes a look-up table listing the VNID for the IMSIs of subscribers of network C. The VNID is passed to the MSC 7 (or SGSN 13). This information from the HLR 19C is thus ready for use in processing communications to or from MS 3C. Any charging information associated with any such communications can then be associated with the subscriber information in VLR 21 and eventually transmitted back to HLR 19C of the virtual network C and then billed to the subscriber.

The VNID is then transmitted by the MSC 7/SGSN 13 to other elements of the network A as an additional part of the data packets conventionally generated and transmitted between those elements.

When such a data packet is received from the MSC 7 or SGSN 13 directly or indirectly by an element, that element may process the data packet and forward the (perhaps modified) data packet to another element. Generally, the forwarded data packet will include the VNID too.

In the arrangement shown in FIG. 2, the virtual network C has its own HLR 19C. However, it is possible that the network C will not have its own home location register 19C, but will instead use the home location register 19 of the host network A. With such an arrangement, the home location register 19 of the home network A will include subscriber data of subscribers to the virtual network C, in addition to the subscriber information of subscribers to the host network A. The home location register 19 will therefore also include VNID's associated with each of the subscribers of the virtual network C—for example in a look-up table listing the IMSI and corresponding VNID for each subscriber of network C.

Figure 3:
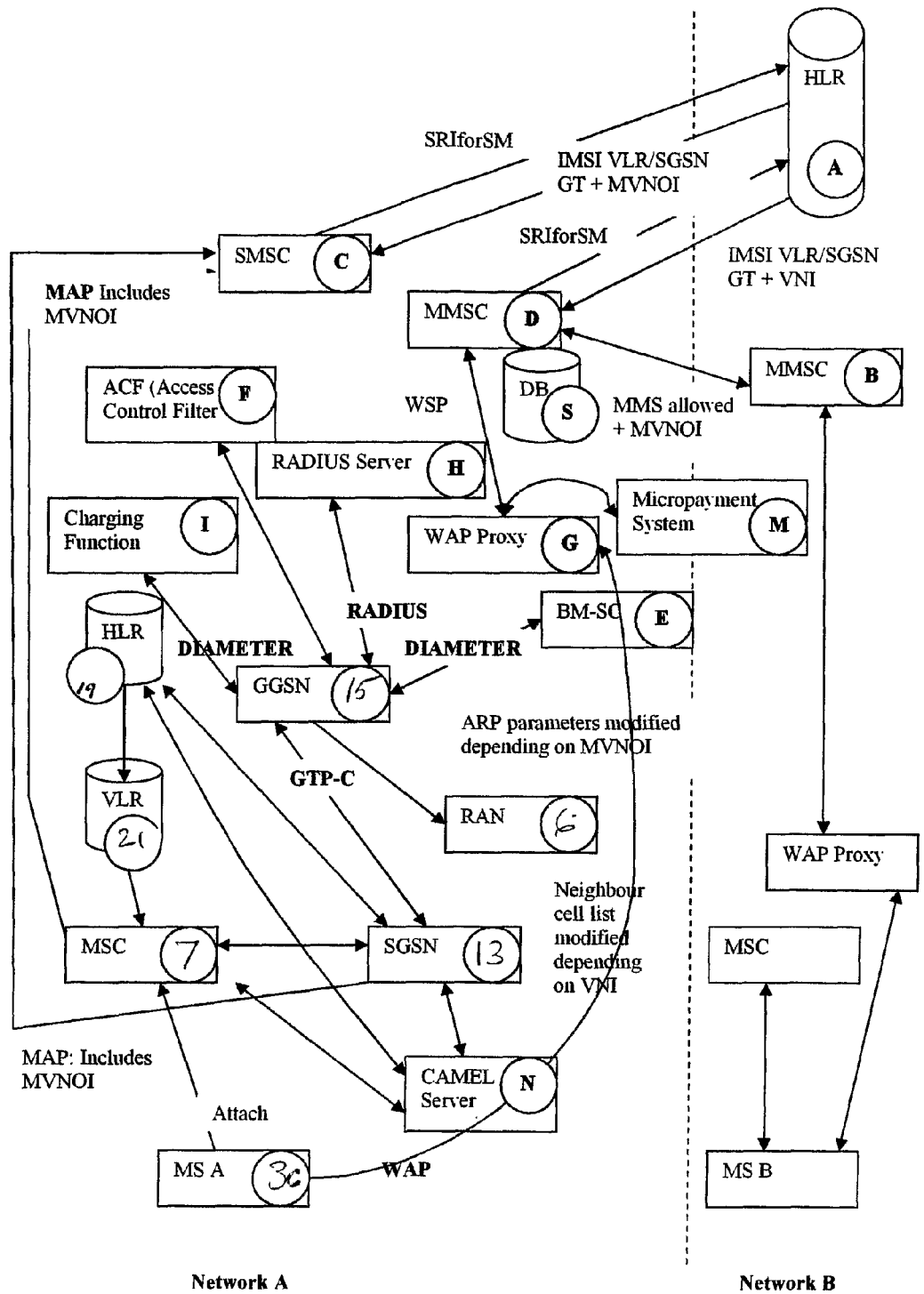
FIG. 3 shows elements of the networks of FIG. 2 and the paths that carry the virtual network identifier.

FIG. 3 shows elements of the network A in more detail and elements of a third network B. The elements of network A are modified so that they can identify and interpret the VNID field in a received data packet. Each element can therefore identify MVNO device communications and can process them differently if appropriate.

In FIG. 3, the virtual network C does not have its own HLR or AUC, but instead uses the HLR 19 and authentication systems of host network A.

The network elements of FIG. 3 are identified in the table below:

| REFERENCE SIGN | ENTITY | EXPLANATION |
| --- | --- | --- |
| A | HLR | Home Location Register of the third network B |
| B | MMSC | MMSC database of MMS enabled subscribers of the third network B |
| C | SMSC | Short Message Service Centre |
| D | MMSC | Multimedia Messaging Service Centre |
| E | BM-SC | Broadcast-Multicast Service Centre |
| F | ACF | Access Control Filter |

-continued

| REFERENCE SIGN | ENTITY | EXPLANATION |
| --- | --- | --- |
| G | WAP Proxy | Wireless Application Protocol Proxy |
| H | RADIUS Server | Remote Authentication Dial-In User Service Server |
| I | Charging Function | |
| 15 | GGSN | Gateway GPRS Support Node |
| 6 | RAN | Radio Access Network |
| 13 | SGSN | Serving GPRS Support Node |
| M | Micropayment System | |
| N | CAMEL Server | Customized Applications for Mobile network Enhanced Logic Server |
| 3C | MS | Mobile Terminal registered with virtual network C |
| 7 | MSC | Mobile Switching Centre |
| 21 | VLR | Visitor Location Register |
| 19 | HLR | Home Location Register |
| S | DB | The database in the MMSC that contains the subscribers allowed to use the MMS service |

Figure 4:
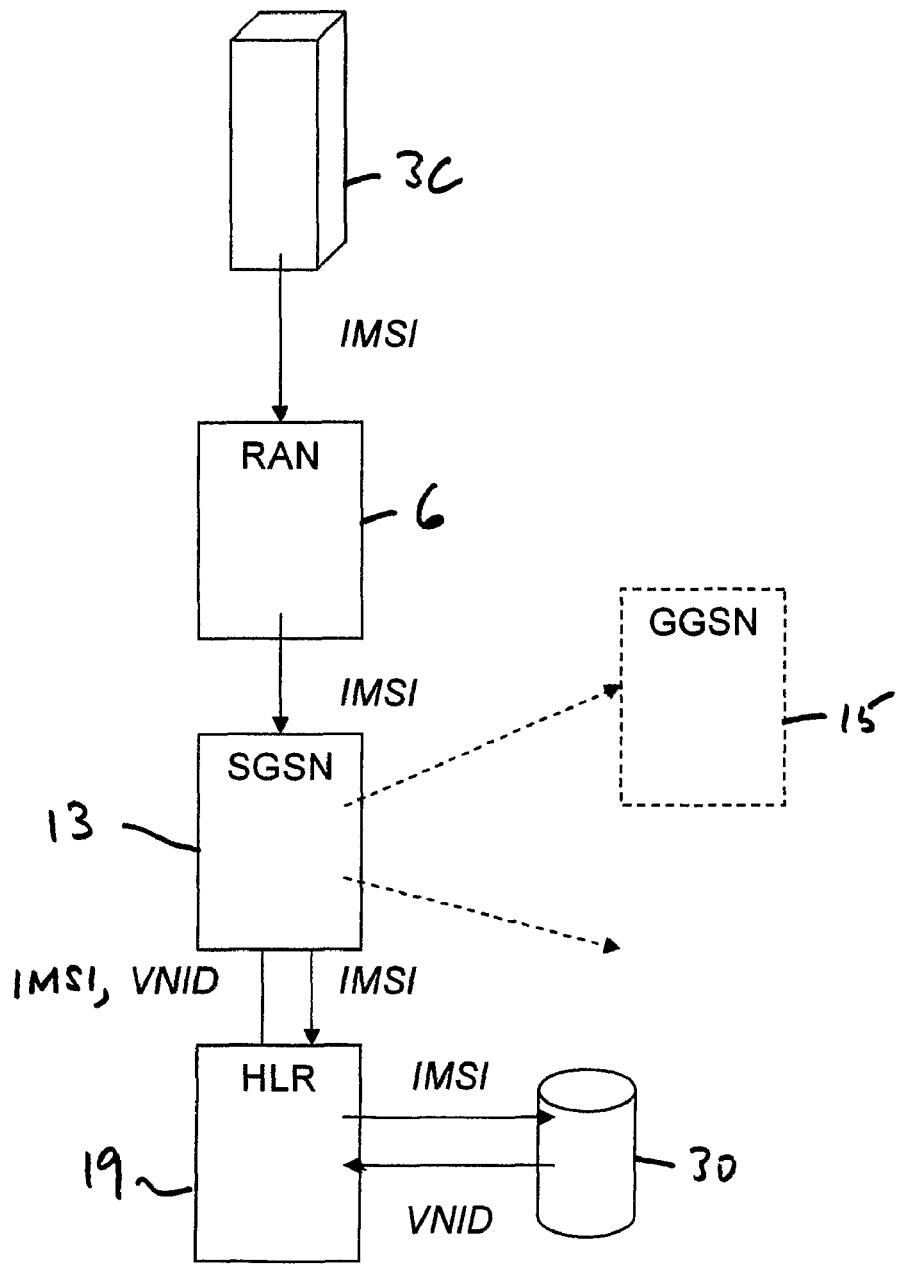
FIG. 4 shows the exchange of messages to obtain a virtual network identifier.

FIG. 4 shows in more detail the exchange of messages that occurs when mobile terminal 3C is operated within the radio access network 6 of network A. In accordance with the conventional signalling procedures, the MS3C transmits its IMSI to RAN 6, and the RAN 6 onwardly transmits this IMSI to the SGSN 13, and from there to the HLR 19 of network A. The HLR 19, in accordance with a feature of this embodiment, transmits the IMSI to look-up table 30. The look-up table 30 includes for each IMSI allocated to mobile terminals registered with the virtual network C (including MS 3C) a respective VNID. The VNID corresponding to the IMSI of MS 3C is returned from the look-up table 30 to the HLR 19. The VNID, together with the IMSI is then passed back to the SGSN 13. Data packets generated by the SGSN for sending to other elements of the network A include the VNID. The VNID may be included in addition to the IMSI. The VNID may be included as a header to the data packets. When an element receives a data packet including the VNID from the SGSN 13—for example the GGSN 15, that receiving element may advantageously include the VNID in any data packets that it generates for sending onwardly to further elements, such as an authentication server, a streaming server or distribution server, or to an IMS sub-system.

As discussed above, the VNID is stored in the HLR 19 as part of the subscription data of the mobile terminal 3C. The VNID is downloaded to the VLR 21 at a circuit switch attach, and to the SGSN 13 at packet switched attach, of the MS 3C.

Referring again to FIG. 3, MMSC B includes a database of MMS enabled subscribers of network B. If a subscriber of network B wishes to send an MMS to a subscriber of network C, the MMSC queries the HLR 19, and the HLR 19 returns the VNID of the subscriber of network C.

The SMSC C is passed the VNID by the MSC 7 and the SGSN 13.

The MMSC D includes a database DB S of MMS enabled subscribers of both network A and the network C. When the MMSC D queries the HLR of the terminating party, the HLR returns the VNID for the terminating party if appropriate. The DB S may store the VNID for relevant subscribers.

The BM-SC E receives the VNID from the GGSN 15 sent by the DIAMETER protocol. The DIAMETER protocol is modified to handle the VNID.

The ACF F is passed the VNID from the GGSN 15. The ACF F may filter content to for virtual network C subscribers differently. For example, the ACF F may block "adult" content for virtual network C subscribers but not for host network A subscribers.

The WAP proxy G is also provided with the VNID.

The GGSN 15 is passed the VNID in the GTP (GPRS Transport Protocol) signalling from the SGSN 13. The GTP protocol is modified to include the VNID field. If the virtual network C has its own GGSN, then the SGSN 13 would be aware of this. On receipt of a data packet including a VNID of the virtual network C, the SGSN 13 would route the data packet to the GGSN of the virtual network C.

The GGSN 15 passes the VNID to the RADIUS server H using the RADIUS protocol.

The RADIUS protocol is modified to handle the VNID.

The GGSN 15 passes the VNID to the Charging Function I using the DIAMETER protocol. The DIAMETER protocol is modified to handle the VNID.

The RAN 6 is passed the VNID by the GGSN 15 and can use it to modify the access retention priority (ARP) of subscribers. The RAN 6 can also use the VNID to modify the neighbour cell list passed to the mobile terminal 3C.

The WAP proxy G may pass the VNID to the Micropayment Systems M.

The CAMEL server N is passed to the VNID from the MSC 7, SGSN 13 and HLR 19. The CAMEL server N analyses short telephone numbers (e.g. 121) and routes calls to the appropriate destination (e.g. voicemail box). The CAMEL server N analyses the VNID, so that a call is routed to a different voicemail box if a user is a subscriber of the virtual network C. The CAMEL protocol is modified to handle the VNID.

The mobile terminal 3 itself may not contain the VNID. That is, the mobile terminal 3C is not passed the VNID and is not provisioned with it. Alternatively, the mobile terminal 3C may be provided with the VNID to facilitate the display of VNID features e.g. network identity, backgrounds, interaction with SIM-TK etc.

The VNID is downloaded to the MSC 7 from the HLR 19 when the mobile terminal 3 attaches for circuit switched services. The MSC 7 can route calls differently depending on the VNID.

The VNID is downloaded to the VLR 21 from the HLR 19 when the mobile terminal 3C attaches for circuit switched services.

As indicated above, the HLR 19 is provisioned with the VNID as part of the subscriber data stored in the HLR 19.

The database DB S in the MMSC D contains the subscribers allowed to use the MMS service also contains the VNID.

In a modification, the SGSN 13 passes the VNID to the RAN 6 after this is received from the HLR 19. This enables the RAN 6 to record use of the radio access network by subscribers to the virtual network C which does not generate billing records in the core of the network A. For example, the RAN 6 could be configured to record a charge against the VNID for the time period during which MS 3C rings another party. No charge is usually rendered for this element of call initiation in a conventional network. However, the host network A may wish to render a charge from this to an individual subscriber of the virtual network C, or to the virtual network C itself, in some circumstances. Also, the RAN 6 might block access to particular service by subscribers of the virtual network C—for example the use of 3G services (only GSM services being allowed). The RAN 6 might give priority to subscribers of host network A or virtual network C at times of congestion.

The VNID may be used by different elements of the network A in various ways. For example, the SGSN 13 could use the VNID in conjunction with DNS look-up to select an appropriate GGSN. The VNID could be used to provide differential content barring two subscribers of network A and subscribers of network C. The VNID could be used to brand content provided to a subscriber of network A and the subscriber of network C differently—for example, such content could include a different logo, depending upon whether a subscriber was the subscriber to network A or network C. The VNID could be used to differentially charge subscribers to network A and network C for receiving substantially the same service. Further, the VNID could be used for providing differential advertisements for reproduction on the terminals of subscribers to network A and network C.

Of course, many other uses of the VNID will also be apparent to those skilled in the art.

The VNID is not accessible by the user of MS 3C. The VNID is hidden from the user of MS 3C in a similar manner to the manner in which the IMSI is hidden conventionally.

The VNID is transmitted using existing protocols (with modification as appropriate). These protocols operate in such a way that if the VNID field is received by an element not configured to interpret the VNID field, the VNID field will be ignored but the data packet will be otherwise processed as normal.

The VNIDs are allocated by the host network A. The VNIDs may not be recognisable to other networks.

Each subscriber to the virtual network C may have a different VNID, or all subscribers to a particular network may have the same VNID. Alternatively, part of the VNID might represent that it is of a particular network, and the remainder may be exclusive to a particular subscriber.

The invention claimed is:

1. A telecommunications system comprising:
   a first telecommunications network with which a first telecommunications device is registered and having a radio access network; and
   a second telecommunications network with which a second telecommunications device is registered and operable to communicate with the second telecommunications device using the radio access network of the first telecommunications network;
   wherein the first telecommunications network includes a plurality of elements, each of which is operable to: perform a function;
   receive communications related to the second telecommunications device;
   wherein means are provided for generating a network identifier for indicating that the second telecommunications device is registered with the second telecommunications network, the generating means being operable to add the network identifier to communications related to the second telecommunications device transmitted to the plurality of elements of the first telecommunications network, the communications also including a user identifier for indentifying a user of the second telecommunication device;
   wherein each of the plurality of elements is operable to interpret the network identifier when received in one of the communications to determine whether the communication is from the first telecommunication device registered with first telecommunications network or from the second telecommunication device registered with the second telecommunications device and to adjust its operation based on the determination;
   wherein each of the plurality of elements is further operable to transmit a further communication derived from the communication to another one of the plurality of elements, the further communication also including the network identifier.

2. The system of claim 1, wherein the second telecommunications network is a virtual network, and wherein the network identifier is a virtual network identifier.

3. The system of claim 2, wherein the second telecommunications network is a mobile or cellular telecommunications network, and wherein the network identifier is a mobile virtual network operator identifier.

4. The system of claim 1, wherein the first telecommunication network is a GSM, UMTS or other mobile or cellular network.

5. The system of claim 1, wherein said generating means comprises home location register means for retrieving the network identifier from a store.

6. The system of claim 5, wherein the home location register means is operable to receive the IMSI of the mobile telecommunications device and to retrieve the network identifier in dependence thereon.

7. The system of claim 1, wherein said generating means is provided by the first telecommunications network.

8. The system of claim 1, wherein said generating means is provided by the second telecommunications network.

9. The system of claim 1, wherein the network identifier is provided to the radio access network.

10. The system of claim 1, wherein said elements of the first telecommunications network include an SGSN and GGSN.

11. The system of claim 1, wherein said plurality of elements include at least one of SMSC, MMSC, content server, authentication server, charging server and voicemail server.

12. The system of claim 1, wherein the first telecommunications network includes an entity which is operable to:
    perform a function;
    receive communications related to the first communications device; and
    receive communications related to the second telecommunications device, and ignore the network identifier and to process the communication including the network identifier in the same manner as if the communication did not include the network identifier.

13. A method of operating a telecommunication system including a first telecommunication network with which a first telecommunications device is registered and having radio access and a second telecommunications network with which a second telecommunications device is registered, the second telecommunications network operable to communicate with the second telecommunications device using the radio access of the first telecommunications network, wherein the first telecommunications network includes a plurality of elements each of which is operable to perform a function, receive communications related to the first telecommunications device, and receive communications related to the second telecommunications device, the method comprising:
    generating a network identifier for indicating that the second telecommunications device is registered with the second telecommunications network;
    adding the network identifier to the communications related to the second communications device that are transmitted to the elements of the first telecommunications network, the communications also including a user identifier for indentifying a user of the second telecommunication device;
    wherein each of the elements of the first telecommunication network interpret the network identifier when received in one of the communications to determine whether the communication is from first telecommunication device registered with the first telecommunication device or the second telecommunication device registered with the second telecommunication device and based on the determination, adjusts its function accordingly, each of the elements also transmitting a further communication derived from the communication to another one of the elements, the further communication including the network identifier.

14. The method of claim 13, wherein the first telecommunications network includes an entity which is operable to:
perform a function;
receive communications related to the first communications device; and
receive communications related to the second telecommunications device, and ignore the network identifier and to process the communication including the network identifier in the same manner as if the communication did not include the network identifier.

15. The method of claim 13, wherein the second telecommunications network is a virtual network, and wherein the network identifier is a virtual network identifier.

16. The method of claim 15, wherein the second telecommunications network is a mobile or cellular telecommunications network, and wherein the network identifier is a mobile virtual network operator identifier.

17. The method of claim 13, wherein the first telecommunication network is a GSM, UMTS or other mobile or cellular network.

18. The method of claim 13, wherein the network identifier is generated by home location register means which retrieves the network identifier from a store.

19. The method of claim 18, wherein the home location register means is operable to receive the IMSI of the mobile telecommunications device and retrieves the network identifier in dependence thereon.

20. The method of claim 13, wherein said generating step is performed by the first telecommunications network.

21. The method of claim 13, wherein said generating step is performed by the second telecommunications network.

22. The method of claim 13, wherein the network identifier is provided to the radio access network.

23. The method of claim 13, wherein said elements of the first telecommunications network include an SGSN and GGSN.

24. The method of claim 13, wherein said elements include at least one of SMSC, MMSC, content server, authentication server, charging server and voicemail server.

* * * * *